Aug. 22, 1944. G. W. GARBE 2,356,309
CONSTRUCTION UNIT
Filed May 9, 1941 5 Sheets-Sheet 1
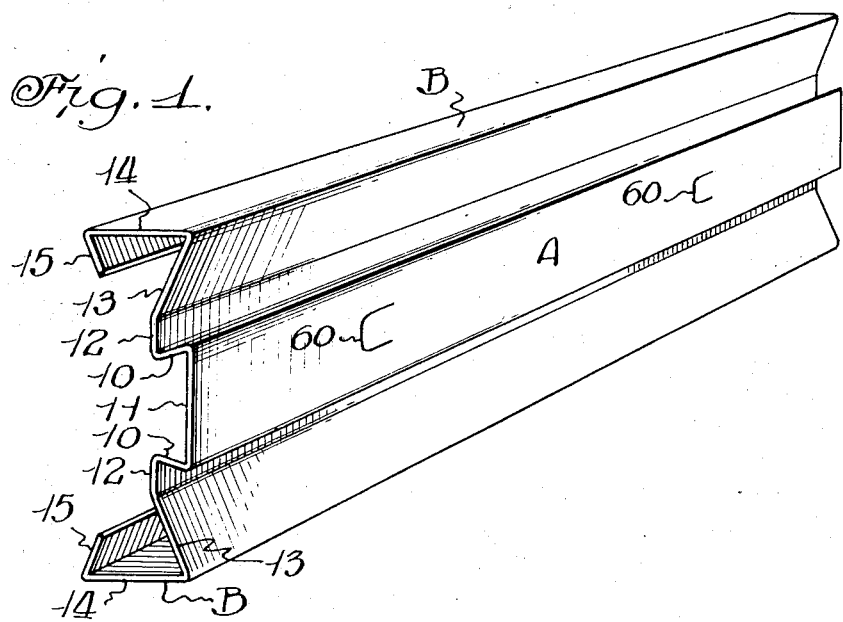
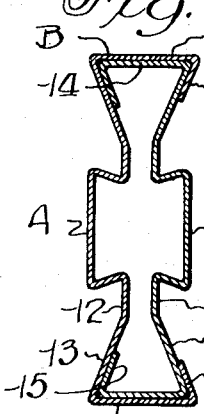
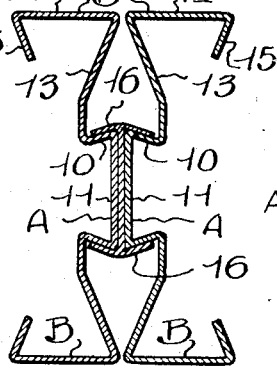
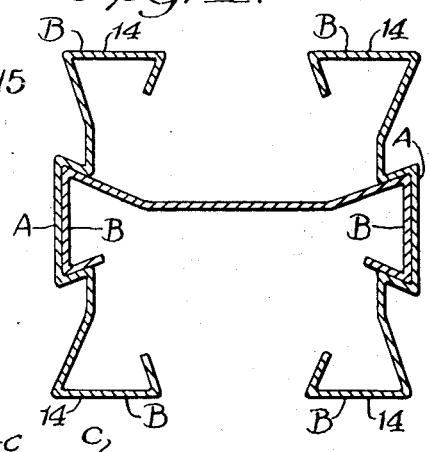
Inventor
Gustav W. Garbe
by Dawson, Ooms and Booth,
His Attorneys

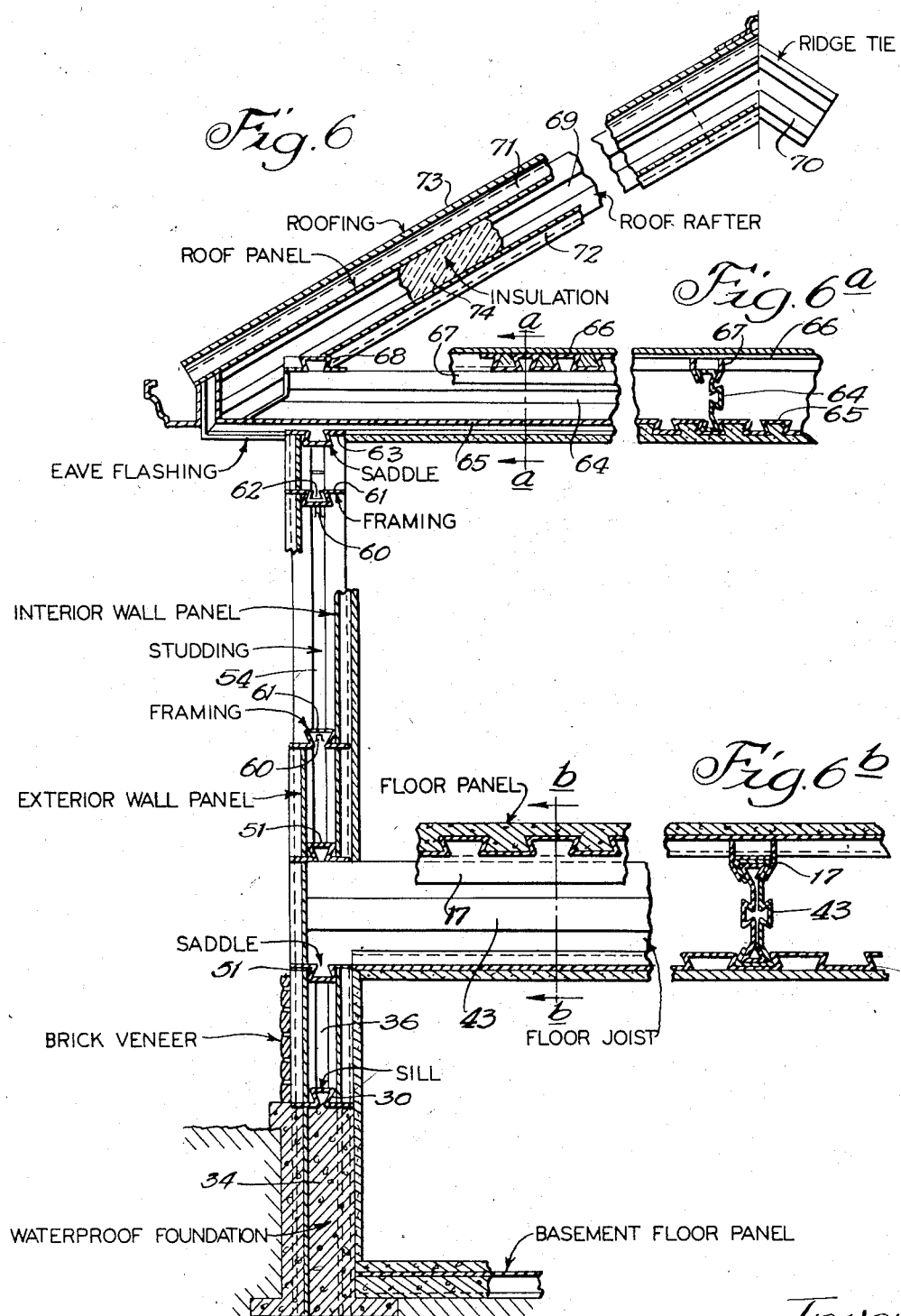

Aug. 22, 1944. G. W. GARBE 2,356,309
CONSTRUCTION UNIT
Filed May 9, 1941 5 Sheets-Sheet 3
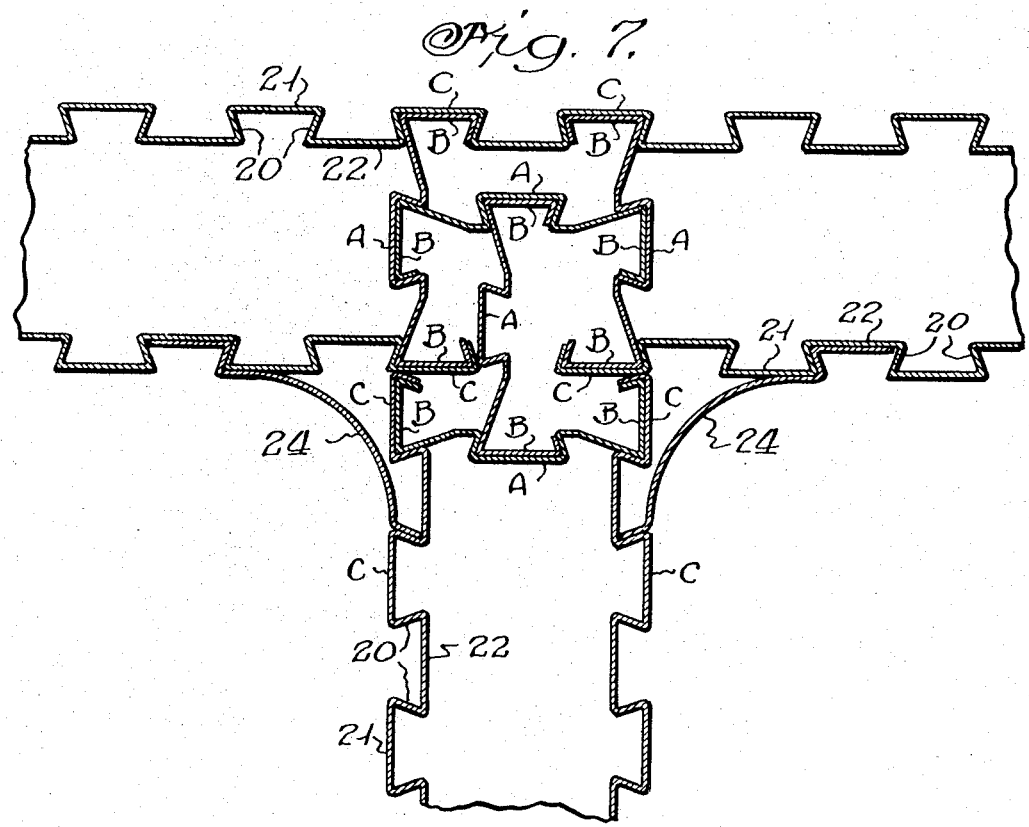
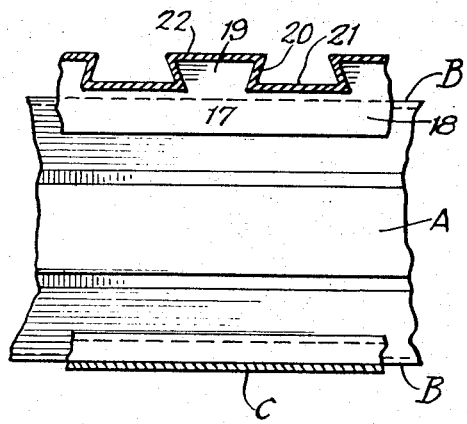
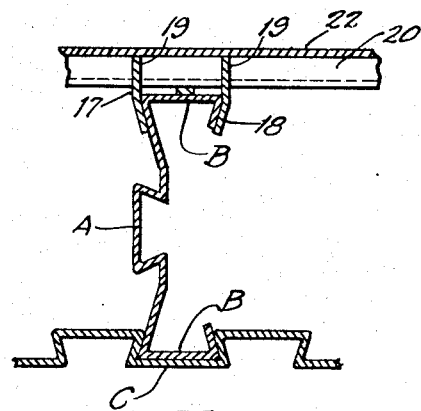
Inventor
Gustav W. Garbe
by Dawson, Ooms and Barth,
His Attorneys.

Aug. 22, 1944.   G. W. GARBE   2,356,309
CONSTRUCTION UNIT
Filed May 9, 1941   5 Sheets-Sheet 4
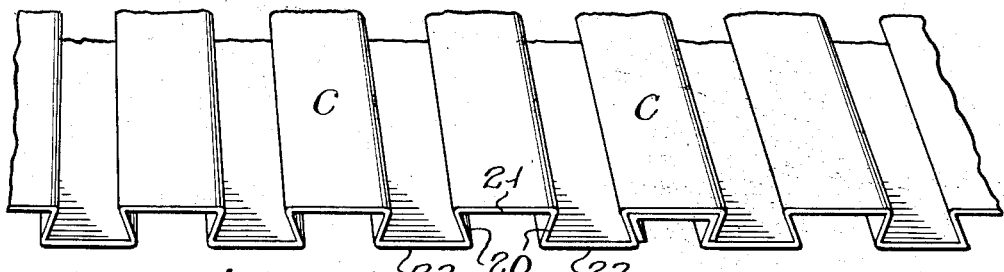
Fig. 10.
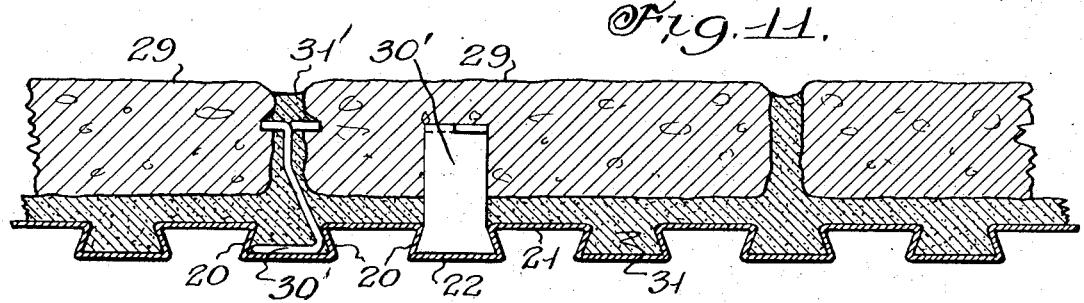
Fig. 11.
Fig. 12.
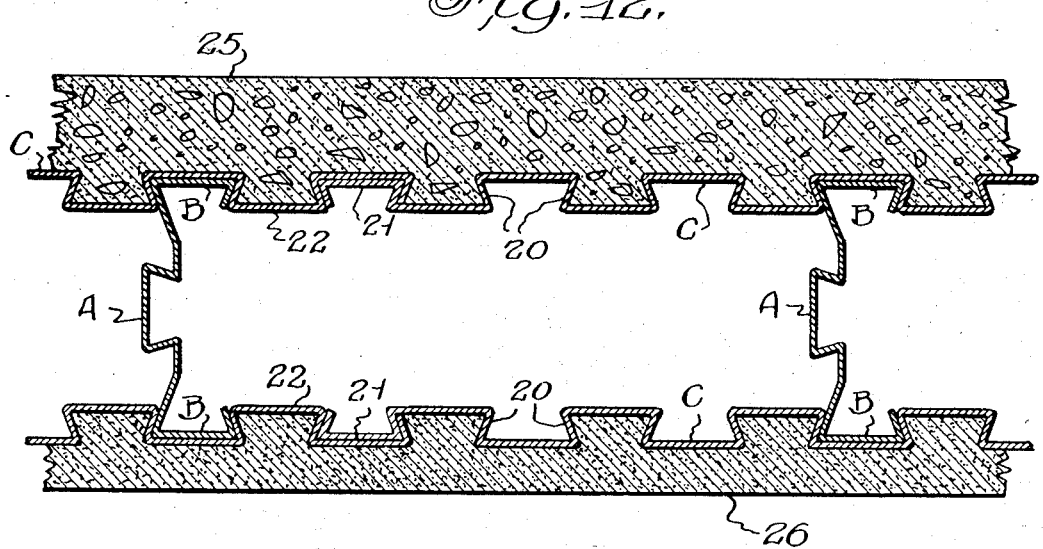
Fig. 13.
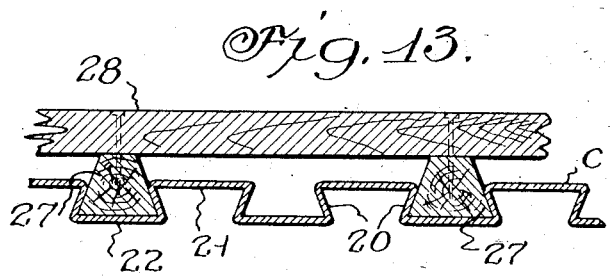
Inventor
Gustav W. Garbe
by Dawson, Ooms and Borth,
His Attorneys.

Aug. 22, 1944.　　　G. W. GARBE　　　2,356,309
CONSTRUCTION UNIT
Filed May 9, 1941　　　5 Sheets-Sheet 5
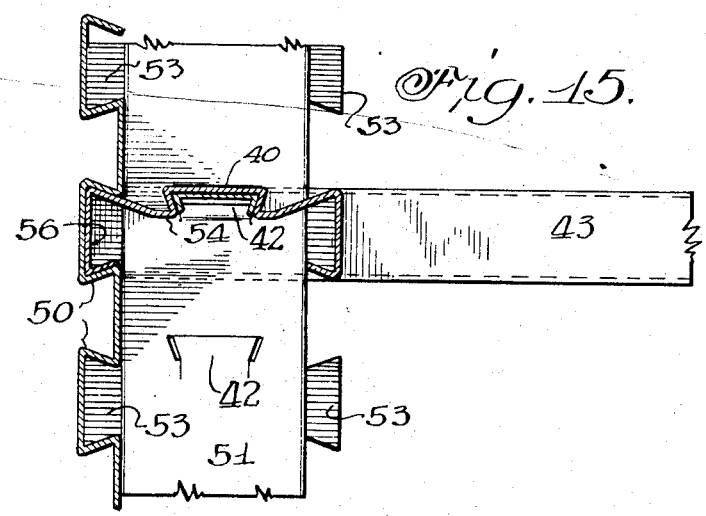
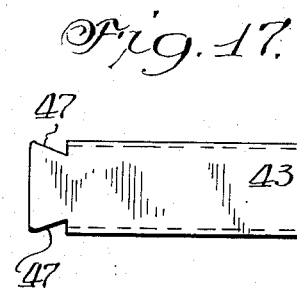
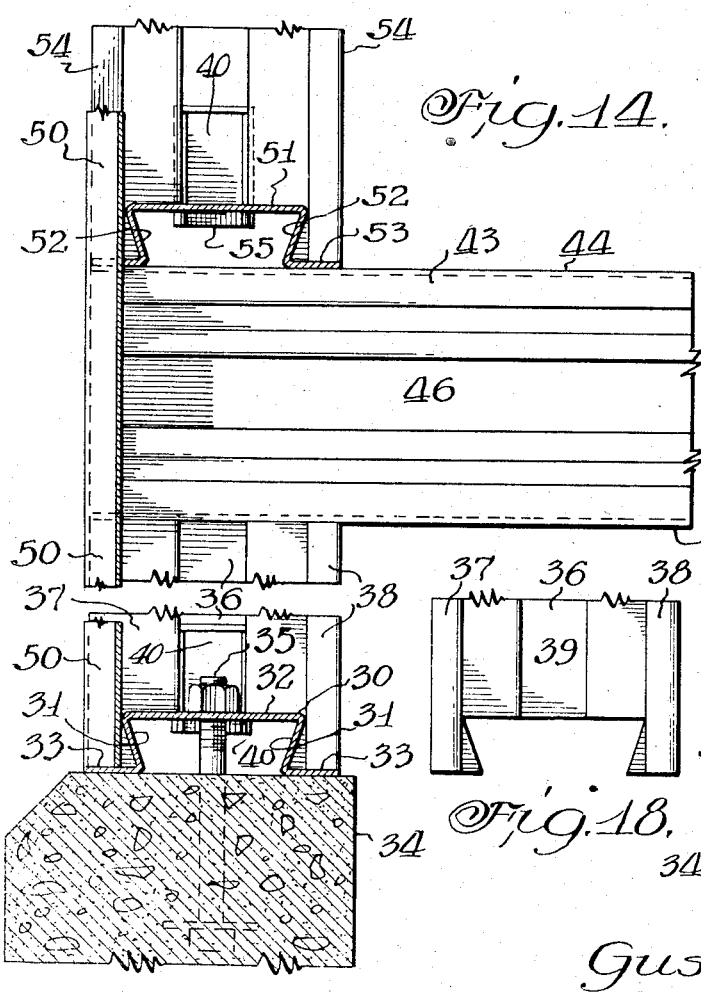
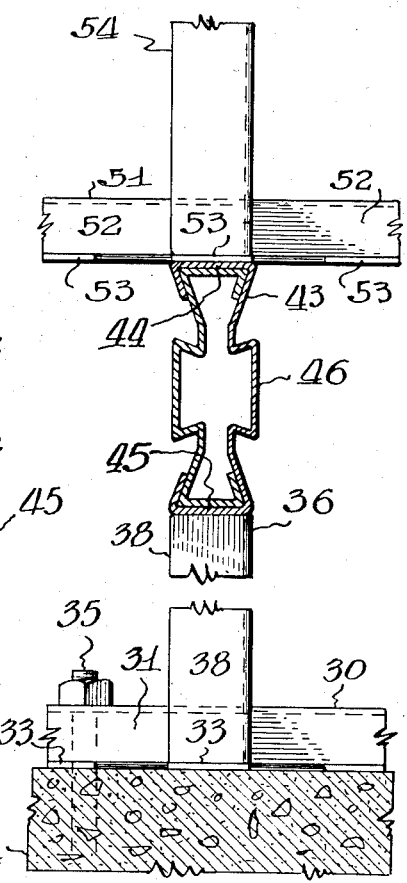
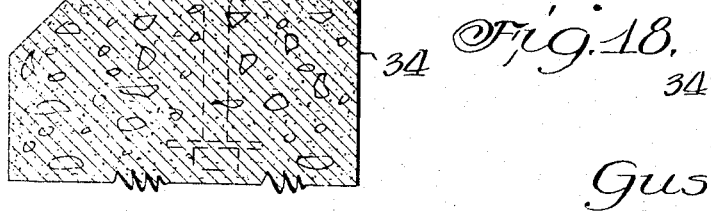
Inventor
Gustav W. Garbe
by Dawson, Ooms and Booth,
His Attorneys Patented Aug. 22, 1944

2,356,309

UNITED STATES PATENT OFFICE 2,356,309

CONSTRUCTION UNIT

Gustav W. Garbe, Chicago, Ill.

Application May 9, 1941, Serial No. 392,683

7 Claims. (Cl. 189—34)

The present invention relates to construction units and more particularly to units for use in permanent or portable construction of domestic and industrial buildings, pontoon and other light bridges, towers, igloos, and body frames for railway cars, automobile trucks or trailers and the like.

In the building industry there has long been a need for a substitute for the wooden construction so expertly developed by our forefathers generations ago, because timber is becoming increasingly scarce and the labor incidental to its use is almost prohibitively expensive. Engineers and designers have been confronted with the problem of providing substitutes for our present building materials and a better system of sound standardized construction, versatile in design to fit the individual requirements, and at a minimum cost to meet exacting schedules. Many substitutes including those formed from steel and iron, have been devised for this purpose, and many shapes and sections are today in ever increasing use. But present designs invariably call for the use of bolts or rivets, welding, or some other such expedient for joining the structural members, which adds both to the initial or shop fabricating costs and consumes labor and time in the final field erection of the project.

Therefore, the primary objects of the present invention are to provide and make available to the construction world a shaped construction unit in a variety of sizes designed to unite into numerous shapes and forms by means of telescopic nesting, and when applied to framing building construction, they will form a rigid self-contained structure without employing the usual laborious methods of joining or separating usually necessitated by the prior art.

It is applicable to conventional construction technique, sufficiently flexible for modular planning, and adaptable to meet dimensional layouts proportionately.

It is interchangeable in use for the various parts or portions in building construction, as a floor joist or studding, roof rafter or purlin, ceiling joist, column or post, beam lintel or truss, sill or framing member, and when supplemented in combination with an associated transition board, becomes most effective as a siding panel, or as a floor, ceiling or roof, partition wall, or other similar construction.

Another object of the invention is to provide construction units which can be assembled into a tight, rigid structure through interfitting shapes and without the use of nails, bolts, rivets or other fastening means. One feature of the units is that they may be assembled and disassembled easily and quickly without requiring skilled labor, the disassembled units being capable of re-use.

Another object of the invention is to provide construction units which permit sufficient flexibility in the art of bonding together materials economically, particularly a surface material such as concrete or brick, stone or tile veneer, plaster, wall board, or wood flooring, a steel porcelain facing, or the like.

Still another object of the invention is to provide construction units which are fireproof, of attractive appearance, light in weight yet exceedingly strong and durable, and economical both to produce and use, and having extremely high salvage value.

Other objects of the invention are to provide a specific structural section formed for joining or key-locking to other members, a section which may be fabricated of relatively light gauge metal in the general form of a standard beam section, and whose locking or keying portions are so related as to materially increase the section modulus of the section and thus serve the dual purpose of both reinforcing the individual unit and providing joining or integral keying means whereby the various units may be key-locked to one another in a rigid and simple manner and without the use of bolts, rivets, nails, welding, or other like expedients.

Yet another object of the invention is to provide construction units which are adaptable in design to either shop prefabrication for mass production, or which may be delivered in single units to the job site for complete field construction in standard stock lengths similar to the usual conventional two-by-fours and other wooden or structural timbers.

The present invention has these and other objects, as may be more readily understood from the following description when read in conjunction with the accompanying drawings, which illustrate a preferred embodiment of my invention, it being manifest that changes and modifications may be resorted to without departure from the spirit of the claims forming a part hereof.

In the drawings:

Figure 1 is a perspective view of a construction unit embodying the invention;

Figure 2 is an end view of a pair of units telescopically arranged in contiguous relation, illustrating one assembly;

Figure 3 is like Figure 2, but shows another mode of assembly of two units;

Figure 4 illustrates a still further nesting arrangement of units assembled into a post or girder;

Figure 5 is a transverse section through a corner of a building wall illustrating a typical corner construction;

Figure 6 is a vertical fragmentary section taken through a portion of a building, illustrating the particular relation of various features of the invention to building construction;

Figures 6a and 6b are partial sections on the lines a—a and b—b respectively of Figure 6;

Figure 7 is a section similar to Figure 5, illustrating the connection of a partition or wall with a building wall;

Figure 8 is a detail illustrating a method employed in securing a transition stool and construction units running transverse to the direction of the grooves or channels in the board.

Figure 9 is a view of Figure 8 taken at ninety degrees to Figure 8;

Figure 10 is a detailed perspective view of a transition construction board;

Figure 11 is a section through a typical exterior wall with brick or tile veneer facing applied;

Figure 12 is a section through a ceiling and floor construction to which ceiling and floor materials have been applied;

Figure 13 illustrates a modification of the construction shown in Figure 12;

Figure 14 is an enlarged fragmental sectional elevation in detail of the saddle studding and joist framing;

Figure 15 is a plan of Figure 14;

Figure 16 is an end elevation of Figure 14 with the transition board removed for better illustration;

Figure 17 is a plan of the coped end of the joist; and

Figure 18 is an elevation of the coped end of the studding.

The present invention contemplates a construction unit, preferably, but not necessarily constructed from relatively light gauge metal formed in the general shape of the standard beam and having a web section with transversely arranged integral key flanges at each end of the web respectively, as indicated by Figure 1 of the drawings. The web section consists of a sheet of material shaped at its mid-section to form a centrally arranged web key A of general U-shaped section, having a pair of symmetrically arranged and inwardly converging inclined side wall portions 10—10 connected with a connecting wall 11. Each side wall portion 10 of the key A is formed outwardly and laterally therefrom at an angle thereto providing spaced apart web sections 12—12 which are substantially parallel to the connecting wall 11, and have their outer ends 13—13 bent back towards the plane of the wall 11 and then transversely therefrom and then down to form a flange and key B in the shape of a key similar to the key A formed in the web, said flange keys B—B each respectively having a connecting wall 14 and inwardly converging side walls 13—15 as shown. The connecting walls 11 of the keys A are provided with a plurality of spaced-apart, partially pierced-out tongues 60—60, which are adapted to remain in place as shown in Figure 1, unless a bracket seat is required, as hereinafter described, when the tongues may be bent either inwardly or outwardly from the position indicated to form integral brackets.

The particular section just described may be preferably made up and delivered to the project in standard lengths such as twelve feet, fourteen or sixteen feet, and conforming to the more or less standardized building requirements for two-by-fours and other similar dimension lumber, where it is then employed in construction as studding, joists, etc., as illustrated at Figure 6 of the drawings. For structures other than buildings, the units may be made up in any other desired sizes.

Where it is found advisable to strengthen the section, two or more standard units may be telescoped, locked and anchored together, as indicated in section in Figures 2, 3 and 4, by means of nesting them. In Figure 2, the enclosed flanges of key members B are formed of a dimension slightly smaller in height and width than the inner adjacent walls to compensate for telescoping in one another, or the units may be placed back-to-back, as shown in Figure 3, by means of lock bars 16—16, which are formed to lock with the wall 10—11 of the associated keys A—A to hold the assembled units in continuous locked relation to one another. Or, the units may be assembled as shown in Figure 4 so that the key flanges B—B of one construction unit are arranged to interlock and join the key members A—A of two similar construction units, thus forming a webbed structural element having the characteristics of a column.

Figure 4 illustrates a variation in one of the structural units itself which is desirable in a column or beam of this type, as well as in various other assembled sections. As shown, the two side units are of the exact form illustrated in Figure 1, while the web unit is formed with the two key flanges B—B as in Figure 1, but is straight across the center portion, the key A being omitted. It will be understood that a unit of this type can be utilized in place of a unit such as that shown in Figure 1 in various locations in which the key A is not necessary for interlocking purposes.

When corners are to be formed, or partitions joined with a wall, standardized units may be assembled, as shown in Figures 5 and 7, and here the connection and interlocking of several units greatly reinforces the construction, as well as providing means of anchorage for the paneling as will hereinafter be described. In this and similar constructions, the units as shown may be built up and connected directly to one another, the key A of one unit being locked to the key B of another until the desired cross-section has been developed.

Cross connections must be made in the usual building construction. Framing of various kinds is also employed. To do this, the cross members of my design may be coped or cut out to match the configuration of the related studding or joist, and one or more of the lugs 60 on the studding bent outwardly to serve as chairs or brackets for supporting the cross member prior to the application of the panel construction (see Figure 6).

Heretofore I have confined myself to the detailed description of the structural unit, per se, and the various ways in which it may be employed, but in order for the unit to comply with the further objects of my invention, and become self-locking and self-supporting as an integral part of a building structure, without employing bolts, rivets or other accessories of securement, I find that a specific form of associated transition board construction including the combination of the construction unit to be most advantageous. Such board construction may embody the use of sheet material, preferably metal formed into a corrugation, as indicated in Figure 10 of the drawings, which has laterally spaced and substantially parallelly disposed ribs C, each rib conforming in general to the cross-section of the keys B of the construction unit as shown in Figure 1. The corrugations each comprise a pair of converging and symmetrically disposed side walls 20—20 with top and bottom connecting walls 21 and 22 respectively, the inside of the top wall 21 being of a dimension slightly greater than the outside dimension of the bottom wall 22 and slightly greater than the overall width of the key flange B of the construction units, so that adjoining boards may be key-locked together, as shown in Figure 10, by one overlapping the adjacent pocket of the other, and so that the boards may lock at terminal points. This construction first definitely spaces the structural or construction units to a predetermined parallel position and then keys and locks them, in this position, at the same time reinforcing and providing a unitary and integral assembly. With this construction, arrangements of the board units are not limited to only locking together side by side but may also be telescoped together lengthwise to make up any desired length without the customary practice of fitting and cutting them to length. As a matter of refinement, I contemplate the use of both exterior and interior corner beads 23 and 24, which can be provided to serve as a finish as well as provide for additional reinforcement of the structure.

This joint construction unit, and particularly the associated board construction is not necessarily limited to walls and partitions. In Figures 12 and 13, I have illustrated a typical floor and ceiling construction, wherein I have indicated the joists comprising the construction unit spaced at required intervals, reinforced and connected to one another by means of a typical board section placed over and keyed to the top, and another typical board section keyed to the bottom of the joists. This construction most satisfactorily lends itself to absolute fire resisting construction, as the floor may then be cast in situ with a plastic such as concrete 25, and the ceiling made with a plaster 26. And as the panelling is formed into pockets or corrugations, the plastic material will flow into the corrugations and when set, remain permanently and most securely keyed in place. When it is found desirable to use a wooden floor or similar floor, wall or ceiling covering, I contemplate the use of grounds or sleepers 27, as shown in Figure 13, formed of material such as wood into which nails can be driven, or such as steel or other fire-proof materials. These grounds are keyed into the corrugations as shown, and then the floor or other covering 28 laid on and glued or nailed to the grounds in the usual manner. The grounds may project above the panel surface, as shown in Figure 13, or may be flush therewith, as shown at the top part of Figure 6.

For an exterior wall, I further provide for a most suitable backing for brick or stone veneer 29, as shown in Figure 11, and here suitable ties 30 may be imbedded at any position in the mortar 31 with one end anchored in the corrugations of the board key, and the projected end to have turned doweled ends in the brick to key the respective facing in place. The interior wall, which is not shown, comprises a similar construction with a cement backing which may be faced with tile as a further indication of the many possibilities contemplated by this construction.

Figures 6 and 6a and 6b illustrate one manner of assembling the units of the invention to form a complete building, certain details of the construction being shown in Figures 14 to 17. In this construction, a waterproof foundation 34 of concrete or masonry supports a sill 30 comprising an inverted channel member having upwardly diverging side walls 31 connected by a flat top wall 32 and having bottom flanges or feet 33 resting on the foundation. Foundation bolts 35 cast into the foundation extend through the top wall 32 to secure the sill in place.

The foundation and the basement floor may be made completely waterproof and may be strengthened, as shown, by imbedding therein panels made up of transition boards keyed together side by side. Such panels preferably extend a few inches above the top of the foundation so that the wall panels may be keyed thereto.

The sill 30 supports studding 36 of general beam formation as previously described with opposed key flanges 37 and 38 and intermediate key flange 39. The bottom end of the studding is coped as shown in Figure 18 to lock over the sill 30 and may also be coped if desired at its upper end to carry an inverted saddle 51. A locking member 40 fits slidably in the intermediate key flange 39 and projects through a pierced opening 42 in sill 30, as shown in Figure 15, to locate and restrict transverse movement of the studs. The locking members 40 may be held in place by the tongue formed by piercing the opening 42. When the locking member is driven into the opening 42 the tongue will bind against it and tend to hold it in place.

The saddle 51 at the top of the studding 36 is primarily employed to connect the tops of the studding for framing. Use of this saddle enables a self-supporting, rigid frame to be assembled before the transition boards are placed on the interior and exterior surfaces, but these saddles may be omitted, if desired, as shown in Figure 14.

Joist members 43 are supported on the studs 36, the joist members being formed as shown in Figures 2 and 16, and having top and bottom flanges 44 and 45 and a centrally arranged channel 46. The end of each joist member is coped as shown at 47 in Figure 17 to interlock with transition board 50 of the type shown in Figures 10 and 11. The transition boards 50 also interlock with the studs 36 and hold the studs and joists in alignment. A ceiling transition board may be directly anchored on the lower flange of the joists and covered with plaster, as in Figure 12, or with wall board or the like as indicated in Figure 6. A floor panel is supported on or anchored to furring stool 17 on the upper flange of the joists so that the corrugations in the transition floor boards run at right angles to the joists for greater rigidity, the floor panel supporting any desired flooring as described above.

The furring stool 17, as shown in Figures 6, 8 and 9, comprises a strip of sheet metal bent into a channel shape to interlock with the key flanges of the joists or other structural members. Bent out ears are formed in the furring stools, shaped to interlock with the key portions of transition boards or other structural members running at right angles to the joists. It will be understood that furring stools may be used to support the wall panels on the studding also, and can further be employed to build up thick walls of transition board with the corrugations in adjacent layers at right angles. Alternatively, the transition boards themselves may be formed with bent out ears to interlock with other boards running at right angles to build up a thick wall.

A saddle 51 is supported on the joists 43, the saddle being formed in the same manner as sill 30, with side channel walls 52 and supporting flanges 53. The flanges 53 are cut out in all of the saddles as shown in Figure 15 to form a series of spaced projections interlocking with the wall transition boards 50.

The saddle 51 supports studding 54, forming a continuation of the studding 36 and supported on the saddle as heretofore described in connection with studding 36, and having an edge flange 56 interlocking with the wall transition boards 50. Cross framing saddles 61 in Figure 6 may be placed between the studding as shown, being supported on the bent out tongues or brackets 60 as described above. If greater strength is required, the central portion of the studding may be slit and bent out as shown at 62 to form a projecting ear slidably interlocking with the central channel in the framing.

The upper end of the studding 54 supports a saddle 63 carrying joists 64. As shown, the joists 64 are single and are not designed to carry as great a load as the joists 43, although if desired, the same construction could be employed. A ceiling panel 65 covered with a desired surface finish is supported on the lower flange of the joists 64 and may, if desired, be continued past the wall to form an eave flashing. A floor panel 66 supported on furring stools 67 and covered as desired may also be placed over the joists 64.

The joists 64 carry saddles 68 supporting the ends of rafters 69 of a construction similar to the joists. As shown, the rafters are notched to fit on the saddles and are connected at the ridge by a ridge tie 70 comprising an angular strip of material of the type shown in Figure 1, slidably fitting into the ends of the rafters and tying them together. A roof panel 71 and an interior panel 72 may be fitted to the outer and inner flanges of the rafters, the roof panel being covered by any desired roofing 73. If desired, the space between the panels 71 and 72 may be filled with insulation, as shown at 74, and the floors, ceilings and side walls could be similarly insulated if desired.

It will be seen that this construction adapts itself to a wide variety of designs and that it can be provided with any desired type of interior and exterior surface finishes. While the invention has been particularly described in connection with house construction, it will be understood that it is equally applicable to many other types of construction, and by the use of the terms "building" or "construction" as used herein, I do not intend to limit the invention to stationary structures. In the finished construction, piping or conduits for plumbing, heating and wiring may advantageously be run in and along the channels in the saddle or sill members, in the transition boards, and in the studdings or joists, without requiring cutting of any load supporting parts.

It will be understood that the particular structure illustrated is illustrative only, and is not to be taken as a definition of the scope of the invention, reference being had for this purpose to the appended claims.

What is claimed is:

1. A construction unit of sheet material formed to general beam formation and comprising a web section terminating at each end thereof respectively in a transversely arranged flange, said web section constituting a centrally arranged and transversely disposed U-shaped key member having symmetrically formed inclined side portions with a connecting end wall, each side portion being formed with a laterally extending arm having an inclined section, and each of said flanges respectively constituting a complementary U-shaped key member adapted to interlock with the web key member of a similar unit and having symmetrically disposed and inclined side portions with a connecting end wall, one of said side portions being formed from the inclined end section of its related arm, and whereby said key members reinforce said unit by increasing its section modulus and further provide means for joining said unit to construction units and panel members.

2. In the art of building construction, a structural unit comprising a plurality of companion units key-locked to each other, and wherein each companion unit comprises a general beam formation including a web section having both top and bottom flanges, said web section of each unit including a centrally arranged key member having symmetrically disposed portions connecting with an end wall, each portion being formed with a laterally extending arm which with said key forms said web section, and each of said flanges respectively constituting a key member, and wherein the flange of one construction unit is arranged to interlock and join with the key member forming a portion of its companion unit.

3. In the art of building construction, a prefabricated structural unit comprising a plurality of companion units key-locked to each other, and wherein each companion unit comprises a general beam formation consisting of a web section having top and bottom flanges, said web section of each unit constituting a centrally arranged U-shaped key member having symmetrically arranged side portions with a connecting end wall, each side portion being formed with a laterally extending arm which with said key forms said web section, and each of said flanges respectively constituting a like U-shaped key member with side portions and a connecting wall, and wherein the flange of one construction unit is arranged to interlock and join with the key member, forming a portion of the web of its companion unit to thereby form a self-contained unitary combination.

4. A construction unit of general beam formation comprising a web section having top and bottom flanges, said web section being formed with a key member arranged between said flanges, said flanges each comprising a key member respectively, said flange key members having symmetrically arranged inclined side portions with a connecting end wall, and an interlocked U-shaped furring stool having side portions and a connecting wall arranged to interlock with one of said flanges, said connecting wall of said stool having tongues punched outwardly from the material thereof in spaced relation, and arranged to engage and lock to a key portion of a transversely extending member for joining said unit and member.

5. A construction unit of general beam formation, including a web section having top and bottom flanges, said flanges each having symmetrically arranged key portions, and a furring stool shaped to interlock with said key portions, and having side portions engaging the side portions of the key portion, said furring stool having a connecting wall having members formed from the material thereof and arranged to engage and lock to the key portion of a unit arranged transversely of said first unit for joining said units.

6. A furring stool comprising an elongated member formed of sheet material shaped into a channel whose sides converge to interlock with a key portion of a construction unit and having ears extending in a direction opposite to the sides of the channel to interlock with the key portion of a unit extending at right angles to the first mentioned construction unit.

7. In a building construction, the combination of a plurality of construction units of general beam formation arranged substantially parallel, each of said units being formed of sheet material and having key-shaped edge flanges, an elongated saddle formed of sheet material having flat edge portions and a central key-shaped channel, the ends of said units being shaped to interlock with said channel and the edges of the saddle being shaped to overlie the key-shaped flanges of said units, and a transition board having a key shaped channel therein to interlock with the flanges of said units and the shaped edges of said saddle.

GUSTAV W. GARBE.